(12) United States Patent
Sundelin et al.

(10) Patent No.: US 9,123,021 B2
(45) Date of Patent: Sep. 1, 2015

(54) SEARCHING LINKED CONTENT USING AN EXTERNAL SEARCH SYSTEM

(75) Inventors: Tore Sundelin, Duvall, WA (US); Alexander Wetmore, Seattle, WA (US); James Edelen, Renton, WA (US); Jorge Pereira, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/962,986

(22) Filed: Dec. 8, 2010

(65) Prior Publication Data

US 2012/0150839 A1 Jun. 14, 2012

(51) Int. Cl.
*G06F 17/30* (2006.01)
*G06Q 10/10* (2012.01)

(52) U.S. Cl.
CPC .......... *G06Q 10/10* (2013.01); *G06F 17/30613* (2013.01)

(58) Field of Classification Search
CPC ................... G06F 17/30613; G06F 17/30616; G06Q 10/10
USPC ........................................................ 707/755
See application file for complete search history.

(56) References Cited

U.S. PATENT DOCUMENTS

| 8,676,792 B1 * | 3/2014 | Scatamacchia et al. ...... 707/724 |
| 2002/0143744 A1 | 10/2002 | Teng |
| 2002/0198962 A1 | 12/2002 | Horn |
| 2003/0074409 A1 * | 4/2003 | Bentley .......................... 709/206 |
| 2005/0283461 A1 * | 12/2005 | Sell et al. ............................ 707/1 |
| 2005/0289111 A1 * | 12/2005 | Tribble et al. ....................... 707/1 |
| 2006/0047518 A1 * | 3/2006 | Claudatos et al. ............. 704/275 |
| 2006/0123010 A1 * | 6/2006 | Landry et al. ................... 707/10 |
| 2006/0123478 A1 * | 6/2006 | Rehfuss et al. .................. 726/22 |
| 2006/0224596 A1 * | 10/2006 | Bird et al. ........................ 707/10 |
| 2007/0266095 A1 * | 11/2007 | Billsus et al. ................. 709/204 |
| 2009/0171907 A1 | 7/2009 | Radovanovic |

FOREIGN PATENT DOCUMENTS

| CN | 101449272 A | | 6/2009 | |
| WO | WO2007098421 | * | 8/2007 | ............ 707/E17.108 |

OTHER PUBLICATIONS

McConnell et al., Good Citizenship When Developing Background Services That Run on Windows Vista, Aug. 2007.*
Microsoft, Windows Search Features, Dec. 4, 2009.*
Wikipedia, Windows Search, Nov. 29, 2009, accessed Jun. 12, 2012.*
Hawking et al.; "How Valuable is External Link Evidence when Searching Enterprise Webs?"; Jan. 1, 2004; http://citeseerx.ist.psu.edu/viewdoc/download?doi=10.1.1.5.4581&rep=rep1&type=pdf; 8 pages.

(Continued)

*Primary Examiner* — William Spieler
(74) *Attorney, Agent, or Firm* — Louise Bowman; Danielle Johnston-Holmes; Micky Minhas (57) ABSTRACT

A message is delivered to an external indexing service when a link is located within a given communication. The message includes a request to index content contained within the link to ensure that the link is indexed. When a keyword search query is performed within the communication system, both a local index and an external index associated with the external indexing service are queried. Results from the query are merged and surfaced.

20 Claims, 6 Drawing Sheets

(56) References Cited

OTHER PUBLICATIONS

Komarek, Paul; "Add-ons for Firefox: Search Everywhere 0.4.1"; Jan. 20, 2010; https://addons.mozilla.org/en-US/firefox/addon/5054/?src=oftenusedwith; 5 pages.
Sentimnt; "where was that place"; Sep. 19, 2010; http://blog.sentimnt.com/post/1151836471/where-was-that-place; 2 pages.
Tschabitscher, Heinz; "Xoopit 1.0.13—Gmail Media Search Add-On"; Sep. 22, 2010; http://email.about.com/od/windowsemailsearchtools/gr/xoopit.htm; 2 pages.
Bogue, Robert; "Using SharePoint Portal Server to Index Your Custom Application"; Sep. 22, 2010; http://www.devx.com/dotnet/Article/27998/1954; 9 pages.
Chinese First Office Action for Application No. 201110418025.X mailed Dec. 17, 2013, 12 pages.
Chinese Second Office Action for Application No. 201110418025.X mailed Apr. 24, 2014, 12 pages.
Windows Search—Wikipedia, the free encyclopedia, http://en.wikipedia.org/wiki/Windows_Search, Jun. 3, 2008, 11 pages.
"Fourth Office Action Issued in Chinese Patent Application No. 201110418025.X", Mailed Date: Nov. 15, 2014, 7 Pages.
"Third Office Action Issued in Chinese Patent Application No. 201110418025.X", Mailed Date: Aug. 6, 2014, 12 Pages.

* cited by examiner

SEARCHING LINKED CONTENT USING AN EXTERNAL SEARCH SYSTEM

BACKGROUND

A keyword search is often employed when searching for content within a set of electronic communications. This may lead to issues when content of interest is contained within a link embedded within a given communication. For example, if a sufficient period of time passes following initial viewing of linked content within an e-mail message, it may be difficult for a user to remember and formulate a search query containing terms contained within the link. In such scenarios, a significant amount of time might be required to relocate content of interest.

SUMMARY

In one aspect, a method for indexing linked content contained within electronic communications includes: indexing, on a computing device, at least one electronic communication; analyzing content of the at least one communication at the computing device to identify linked content contained therein; forming a message at the computing device including a request to index the linked content; and sending the message from the computing device to an external service for indexing the linked content.

In another aspect, a method for searching linked content contained within electronic communications in a communication system includes: receiving a search string at the communication system from a messaging application comprising at least one key term for searching electronic communications; querying a local index at the communication system according to the search string to obtain first local query results; identifying, at the communication system, at least one external service having received linked content from the communication system; sending a message from the communication system to the external service, the message including a request to perform an external search of an external index; receiving a response from the external indexing service including external query results; querying the local index at the communication system using the external query results to obtain second local query results; and returning merged search results to the messaging application including at least a portion of the first local query results and the second local query results.

In yet another aspect, a computing device includes: a processing unit; and a system memory connected to the processing unit, the system memory including instructions that, when executed by the processing unit, cause the processing unit to implement an indexing module and a searching module for evaluating linked content contained within electronic communications, wherein the indexing module is configured to: receive instruction to index at least one electronic communication; analyze content of the at least one communication to identify linked content contained therein; form a first message including a request to index identified linked content, wherein the first message includes an index process identifier and identified linked content; and send the first message to a first external service for indexing identified linked content; and the search module is configured to: receive a search string comprising at least one key term for searching a plurality of electronic communications; query a local index according to the search string to obtain first local query results; identify at least one external service having received linked content from the search module; send a second message to the at least one external service, the second message including a request to perform an external search of an external index; receive a response from the at least one external indexing service including external query results; query the local index according to the external query results to obtain second local query results; and return merged search results comprising an intersection of the first local query results and the second local query results.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed towards indexing and searching linked content contained in electronic communications in an electronic communication system.

In example embodiments, a message is delivered to an external indexing service when a link is located within a given communication. The message includes a request to index content associated with the link. When a keyword search query is performed within the communication system, both a local index and an external index associated with the external indexing service are queried. Results from the query are merged and surfaced. Although not so limited, an appreciation of the various aspects of the present disclosure will be gained through a discussion of the examples provided below.

Figure 1:
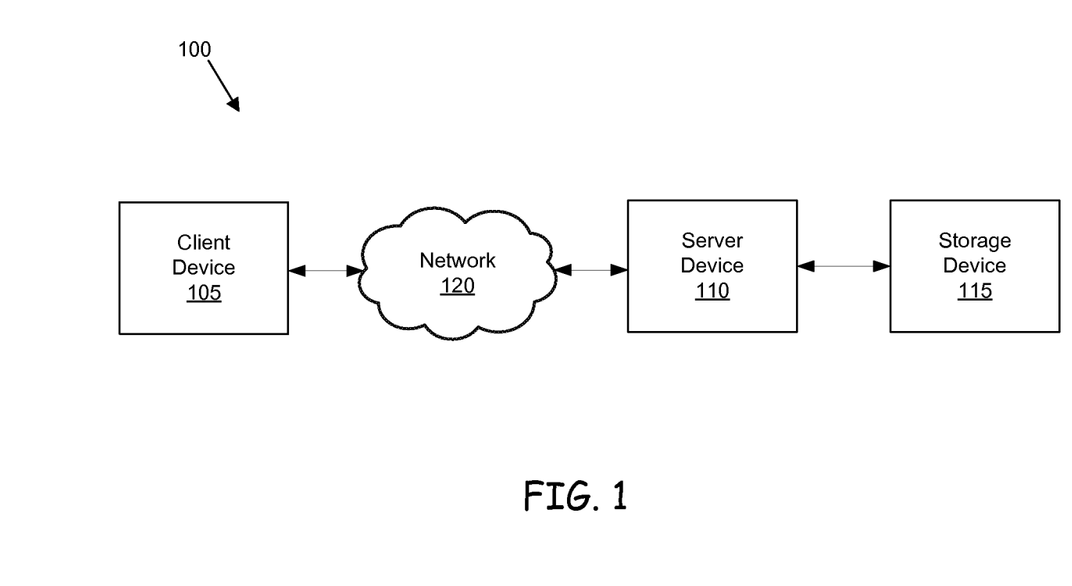
FIG. 1 shows an example networked computing environment.

Referring now to FIG. 1, an example networked computing environment 100 is shown. The computing environment 100 includes a client device 105, a server device 110, a storage device 115, and a network 120. Other embodiments are possible. For example, the computing environment 100 may generally include more or fewer devices, networks, and other components as desired.

The client device 105 and the server device 110 are general purpose computing devices, such as described below in connection with FIG. 2. In example embodiments, the server device 110 is a business server that implements business processes. Example business processes include messaging and communications process, collaboration processes, data management processes, and others.

SHAREPOINT® collaboration server from Microsoft Corporation of Redmond, Wash. is an example of a business server that implements business processes in support of collaboration, file sharing and web publishing. Exchange Server, also from Microsoft Corporation, is an example of a business server that implements messaging and collaborative business processes in support of electronic mail, calendaring, and contacts and tasks features, in support of mobile and web-based access to information, and in support of data storage. Other business processes are possible.

In some embodiments, the server device 110 includes of a plurality of interconnected server devices operating together in a "Farm" configuration to implement business processes Other embodiments of the server device 110 are possible.

The storage device 115 is a data storage device, such as a relational database or any other type of persistent data storage device. The storage device 115 stores data in a predefined format such that the server device 110 can query, modify, and manage data stored thereon. Examples of such a data storage device include mailbox stores and address services such as ACTIVE DIRECTORY® directory service from Microsoft Corporation. Other embodiments of the storage device 115 are possible.

The network 120 is a bi-directional data communication path for data transfer between one or more devices. In the example embodiment, the network 120 establishes a communication path for data transfer between the client device 105 and the server device 110. In general, the network 120 can be of any of a number of wireless or hardwired WAN, LAN, Internet, or other packet-based communication networks such that data can be transferred among the elements of the example computing environment 100. Other embodiments of the network 120 are possible.

Figure 2:
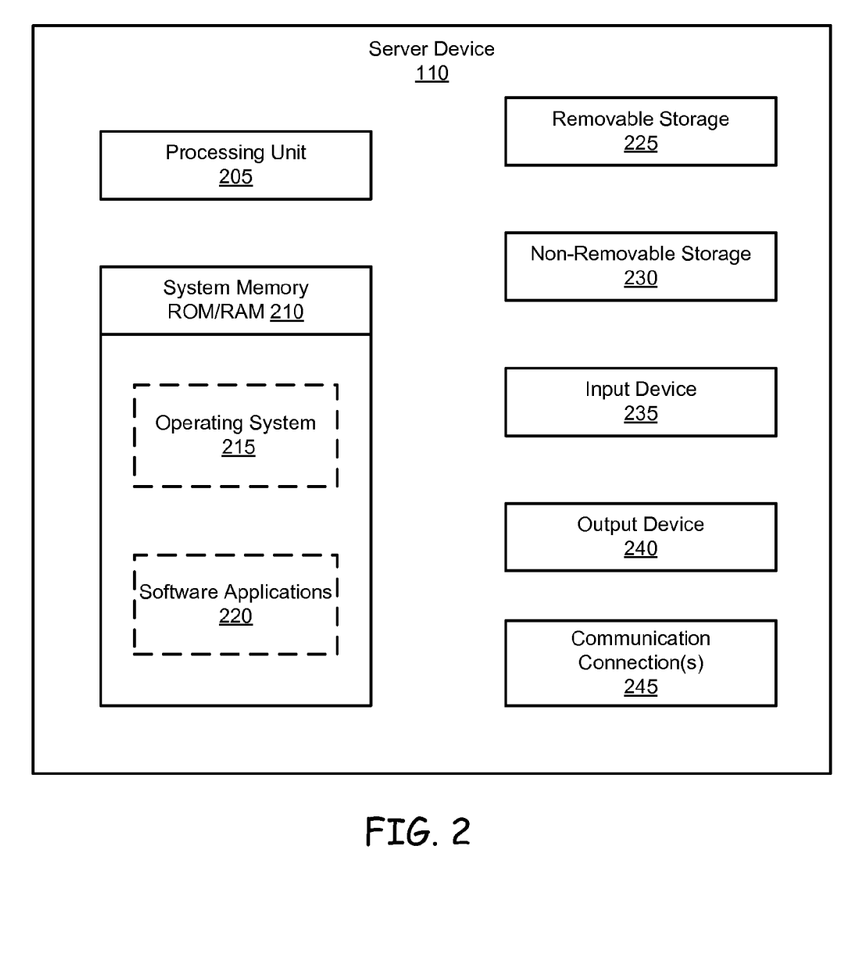
FIG. 2 shows an example server computing device.

Referring now to FIG. 2, the server device 110 of FIG. 1 is shown in further detail. As mentioned above, the server device 110 is a general purpose computing device. Example general purpose computing devices include a desktop computer, laptop computer, personal data assistant, smartphone, cellular phone, and other computing devices.

The server device 110 includes at least one processing unit 205 and system memory 210. The system memory 210 can store an operating system 215 for controlling the operation of the server device 110 or another computing device. One example operating system 215 is WINDOWS® operating system from Microsoft Corporation, or a server, such as Exchange server, SHAREPOINT® collaboration server, and others.

The system memory 210 may also include one or more software applications 220 and may include program data. Software applications 220 may include many different types of single and multiple-functionality programs, such as an electronic mail program, a calendaring program, an Internet browsing program, a spreadsheet program, a program to track and report information, a word processing program, an instant messaging program, a web conferencing service program, and many others. One example program is the Office suite of applications from Microsoft Corporation.

The system memory 210 can include computer readable media. Examples of computer readable media include computer readable storage media and communication media. Computer readable storage media is distinguished from communication media.

Computer readable storage media can include physical volatile and nonvolatile, removable and non-removable media implemented in any method or technology for storage of information, such as computer readable instructions, data structures, program modules, or other data. Computer readable storage media can also include, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by server device 110. Any such computer storage media may be part of or external to the server device 110. Such storage is illustrated in FIG. 2 by removable storage 225 and non-removable storage 230.

Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 110 can also have any number and type of input devices 235 and output devices 240. Example input devices 235 include a keyboard, mouse, pen, voice input device, touch input device, and others. Example output devices 240 include a display, speakers, printer, and others. The server device 110 can also include a communication connection 245 configured to enable communications with other computing devices over a network (e.g., network 120) in a distributed computing system environment.

The client device 105 of FIG. 1 is configured similar to the server device 110 as described above.

Figure 3:
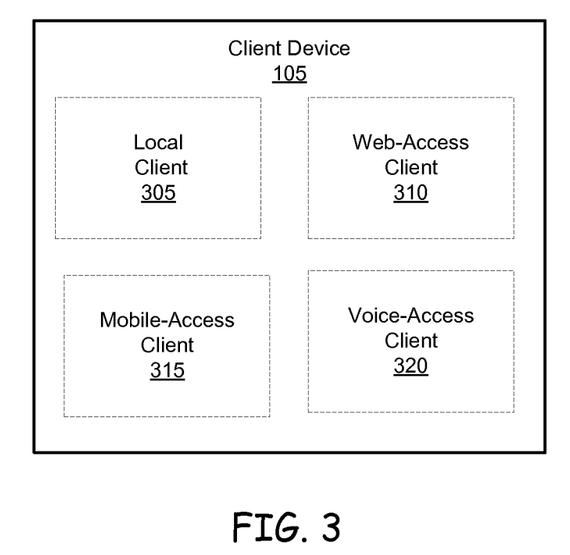
FIG. 3 shows example logical modules of a client computing device.

Referring now additionally to FIG. 3, the client device 105 is also configured to include one or more different types of client interfaces to the server device 110. In the example shown, the client device 105 includes a local client 305, a web-access client 310, a mobile-access client 315, and a voice-access client 320. Other types of client interfaces to the server device 110 are possible as well.

The local client 305 is configured as a dedicated messaging and collaboration client that serves as an interface to the server device 110, and is part of a suite of applications executing on the client device 105. In one embodiment, the local client 305 includes the OUTLOOK® messaging and collaboration client, which is an e-mail application that is part of the Office suite from Microsoft Corporation. A user can compose, interact with, send and receive e-mails with the OUTLOOK® messaging and collaboration client. Other embodiments of the local client 305 are possible. For example, in one embodiment, the local client 305 includes the Office Communicator client from Microsoft Corporation, an instant messaging client used with Office Communications Server. Still other embodiments of the local client 305 are possible as well.

The web-access client 310 is configured to accesses the server device 110 remotely using a network connection, such as the Internet. In one embodiment, the web-access client 310 is the Outlook Web Access (OWA) webmail service of Exchange Server. In the example embodiment, the client device 105 uses a web browser to connect to Exchange Server via Outlook Web Access. This brings up a user interface similar to the interface in the OUTLOOK® messaging and collaboration client in which a user can compose, interact with, send and receive e-mails. Other embodiments of the web-access client 310 are possible. For example, the web-access client 310 may be configured to connect to SHAREPOINT® collaboration server to access corresponding collaboration, file sharing and web publishing services. Still other embodiments of the web-access client 310 are possible.

The mobile-access client 315 is another type of client interface to the server device 110. In one embodiment, the mobile-access client 315 includes the Mobile Access with ACTIVE- SYNC® synchronization technology or the Windows Mobile Device Center for WINDOWS VISTA® operating system or Windows 7 operating system, all from Microsoft Corporation. Example mobile devices include a cellular telephone, smartphone, a personal digital assistant, and others. Other embodiments of the mobile-access client 315 are possible.

The voice-access client 320 is yet another type of client interface to the server device 110. In some embodiments, the voice-access client 320 includes Exchange Unified Messaging that is supported in Exchange Server. With Unified Messaging, users have one inbox for e-mail and voicemail. Voicemails are delivered directly into the OUTLOOK® messaging and collaboration client inbox. The message containing the voicemails may also include an attachment. Other embodiments of the voice-access client 320 are possible.

Figure 4:
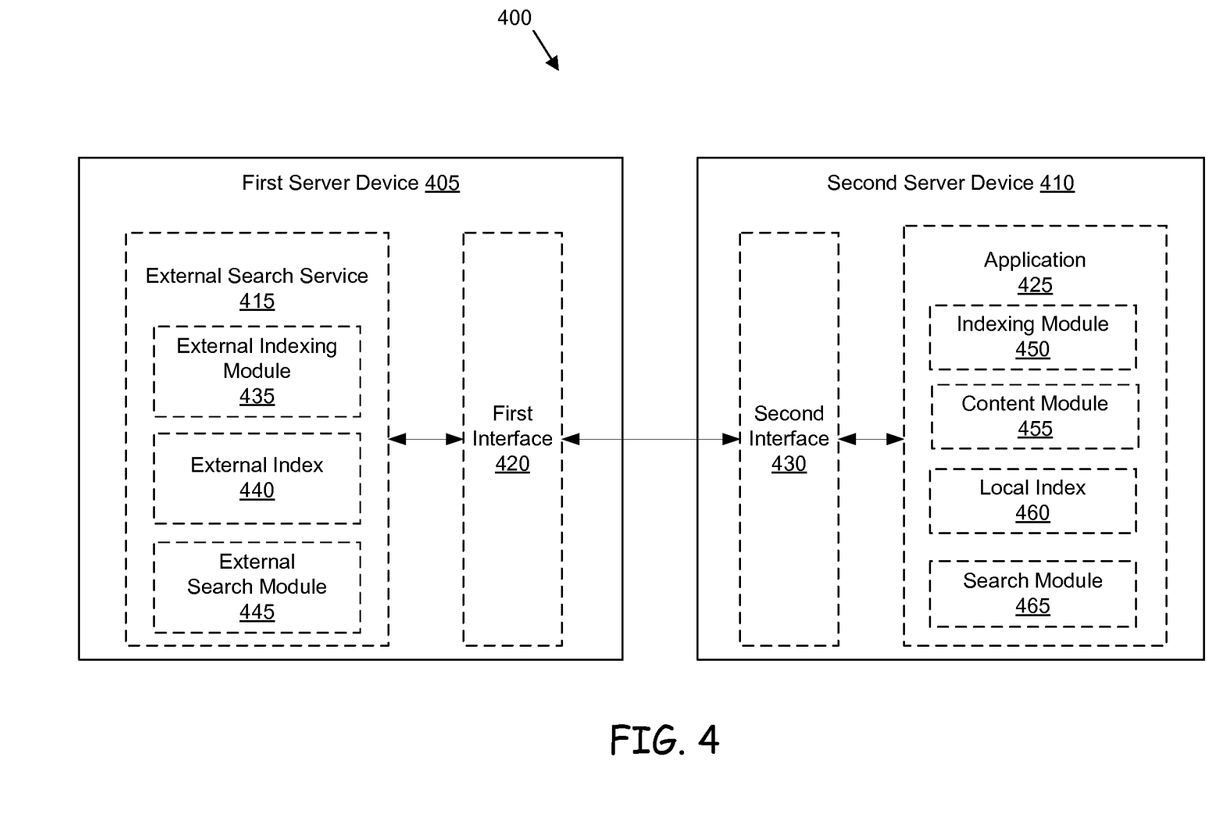
FIG. 4 shows example communications between example computing devices.

Referring now to FIG. 4, an example block diagram 400 illustrates communications between computing devices to index and search linked content contained in an electronic communication. Example communications include an e-mail message, a text message, an instant message, calendar items, task items, note items, social collaboration messages (e.g., Facebook status updates, Twitter updates, etc.), and voicemail messages (e.g., transcribed to text). Still other types of electronic communications are possible.

The block diagram 400 includes a first server device 405 and a second server device 410, each configured similar to the server device 110 described above. The first server device 405 further includes an external indexing service 415 and a first interface 420. The second server device 410 further includes an application 425 and a second interface 430. Other configurations are possible. For example, the block diagram 400 may generally include more or fewer computing devices and other components as desired.

The external indexing service 415 of the first server device 405 includes logical modules of software executing on the first server device 405 that implements functionality of an indexing service, such as a web indexing service (e.g., Bing, Google, etc.), a document indexing service (e.g., SharePoint, etc.), and others. For example, the external indexing service 415 includes an external indexing module 435, an external index 440, and an external search module 445. Other logical modules of the external indexing service 415 are possible.

The external indexing module 435 of the external indexing service 415 is configured to crawl and parse web page or document content housed externally from the first server device 405, and store the parsed content in the external index 440. The external search module 445 is configured to receive a search query including one or more search criteria (e.g., keyword), evaluate the search query against the parsed content in the external index 440, and return information (e.g., link) corresponding to one or more web pages or documents containing content associated with the search criteria to a search query originator (e.g., browser). In example embodiments, web page or document content includes any directly observable or otherwise inferred information contained within a given web page or document.

The application 425 of the second server device 410 includes logical modules of software executing on the second server device 410 that implements indexing functionality of a business server configured to support electronic communication processes. For example, the application 425 includes an indexing module 450, a content module 455, a local index 460, and a search module 465. Other logical modules of the application 425 are possible as well.

The indexing module 450 of the application 425 is configured to collect and parse electronic communications content contained within the content module 455, and store the parsed content in the local index 460. The search module 465 is configured to receive a search query including one or more search criteria (e.g., keyword), evaluate the search query against the parsed content in the local index 460, and return one or more electronic communications containing content associated with the specified search criteria to a search query originator (e.g., messaging client).

In the example of indexing linked content of e-mail messages, the indexing module 450 of the application 425 is additionally configured to identify and collect information related to linked content contained within an e-mail message. An example of linked content includes a uniform resource locator (URL) embedded within an e-mail message. Upon discovery of linked content, the application 425 is configured to transfer the linked content to the external indexing service 415 for indexing. Such indexing beneficially ensures that linked content contained within an e-mail message is indexed to facilitate future discovery.

In the example of searching linked content of e-mail messages, a keyword search may be formulated via the search module 465 and evaluated against the local index 460 to surface e-mail messages from the content module 455 containing content of interest. Upon receipt of the keyword search, the application 425 is additionally configured to transfer the keyword search to the external indexing service 415 for evaluation against the external index 440. Any results, such as a link, from the external index 440 are returned to the application 425 and evaluated against the local index 460 to surface e-mail messages from the content module 455 containing at least a portion of the link. Merged results are then presented to the particular user. Such example searching beneficially leverages multiple resources to provide increasingly accurate and complete keyword search results.

Figure 5:
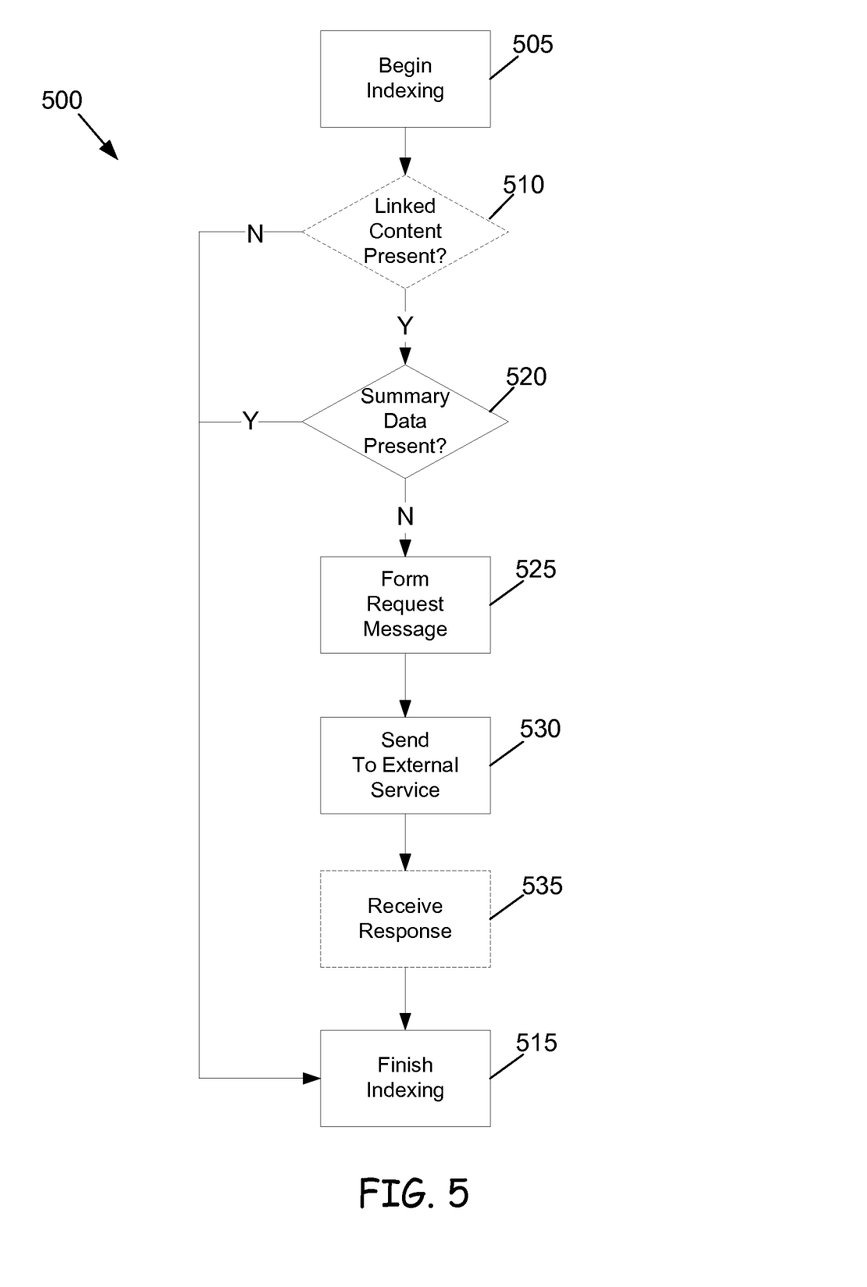
FIG. 5 shows a flowchart of an example method for indexing linked content contained in electronic communications in an electronic communication system.

Referring now to FIG. 5, an example method 500 for indexing linked content contained within an electronic communication is shown. In example embodiments, the method 500 is implemented by an application at a communication system, such as the indexing application executing at the server device described above in connection with FIG. 4. Other embodiments are possible.

The method 500 begins at an index module 505. The index module 505 is configured to instantiate and implement a process for indexing content of the e-mail message upon receipt of the e-mail message within an inbox of a particular user. Other embodiments are possible. For example, in some embodiments, the index module 505 is configured to periodically instantiate and implement indexing processes to maintain index content of an e-mail message mailbox of a particular user.

Operational flow proceeds to a discovery module 510. The discovery module 510 is configured to analyze source level (e.g., HTML, etc.) content of the e-mail message to identify presence of linked content contained therein. An example of linked content includes a uniform resource indicator (URI) such as a uniform resource locator (URL). An example URL includes "http://www.microsoft.com." Other embodiments are possible. For example, the discovery module 510 may discover syntactically incorrect linked content (e.g., "www-.microsoft," "microsoft.com," "http.microsoft," etc.).

Operational flow branches to a resume module 515 when linked content is not identified within the e-mail message by the discovery module 510. The resume module 515 is configured to complete indexing of the e-mail message and store indexed content in a local index maintained by the indexing application.

When linked content is identified within the e-mail message by the discovery module 510, operational flow proceeds to a query module 520. The query module 520 is configured to analyze the local index to determine whether summary data associated with the identified linked content is contained therein, as described in further detail below. When the query module 520 determines that summary data for the linked content is contained within the local index, operational flow proceeds to the resume module 515 to complete indexing of the e-mail message.

When the query module 520 determines that summary data for the linked content is absent from the local index, operational flow proceeds to a message module 525. The message module 525 is configured to generate a message including a request addressed to an external indexing service to index content associated with discovered linked content. An example message indexing related message "I" includes an identifier designating a name and electronic address of the indexing application, the discovered linked content, and additional metadata (e.g., I=[ID, http://www.microsoft.com, metadata]). Example metadata of the message includes any additional information that may be considered valuable to external indexing service and/or monetized such as; for example, a number of times the same linked content has been discovered by the discovery module 510, e-mail message priority, etc. Other embodiments are possible.

Transferring metadata to the external indexing service is beneficial in many aspects. For example, such metadata enables the external indexing service to more fully characterize the link, such as refining a relevancy calculation, or return status of specific content of a given linked content. In another example, burden associated with indexing linked content is transferred from the indexing application to the external indexing service. In this manner, resources of the indexing application that would otherwise be required to index linked content are available for other tasks. Additionally, potential security risk associated with indexing unknown content is transferred from the indexing application to the external indexing service. In another example, potential for revenue sharing is enabled between the an entity associated with the indexing application and an entity associated with external indexing service as external indexing services highly value links to content and monetize them.

Following the message module 525, operational flow proceeds to a send module 530. The send module 530 is configured to send the message "I" generated by the message module 525 to the external indexing service. In some embodiments, the send module 530 additionally populates a list maintained by the indexing application designating that linked content has been transferred to the particular external indexing service, as described in further detail below in connection with FIG. 6.

In example embodiments, the message "I" is formed by an interface (e.g., first interface 420) according to properties of a communication channel for transport between the indexing application and the external indexing service, such as remote procedure call or other form of asynchronous or synchronous communication channel. The message "I" is received by an interface (e.g., second interface 430) of the external indexing service which then determines whether the linked content contained with the message has previously been indexed. If the linked content contained with the message has not been previously been indexed, the external indexing service indexes the linked content. In some embodiments, when the linked content contained with the message has previously been indexed but an extended period of time has been since the indexing, the external indexing service indexes the linked content.

Operational flow then proceeds to a receive module 535. In one embodiment, the receive module 535 is configured to receive a response message from the external indexing service including designation that the linked content discovered by discovery module 510 is indexed. In other embodiments, the response message from the external indexing service includes summary data for the linked content. Example summary data includes one or more key terms, contextual information, and other content associated with the linked content. In the example embodiment, the receive module 535 populates the local index with the summary data. Such a step beneficially affords search speed improvements over the send module 530 sending a message to the external search system every time linked content is identified within an e-mail message. Operational flow then proceeds to the resume module 515 to complete indexing of the e-mail message.

Other embodiments of the example method 500 are possible as well. For example, in some embodiments, functionality implemented by one or both of the discovery module 510 and the receive module 535 are omitted, represented by intermittent lines in FIG. 5. In the example embodiment, process flow proceeds from the index module 505 directly to the query module 520, and process flow proceeds from the send module 530 directly to the resume module 515. Other embodiments are possible.

Figure 6:
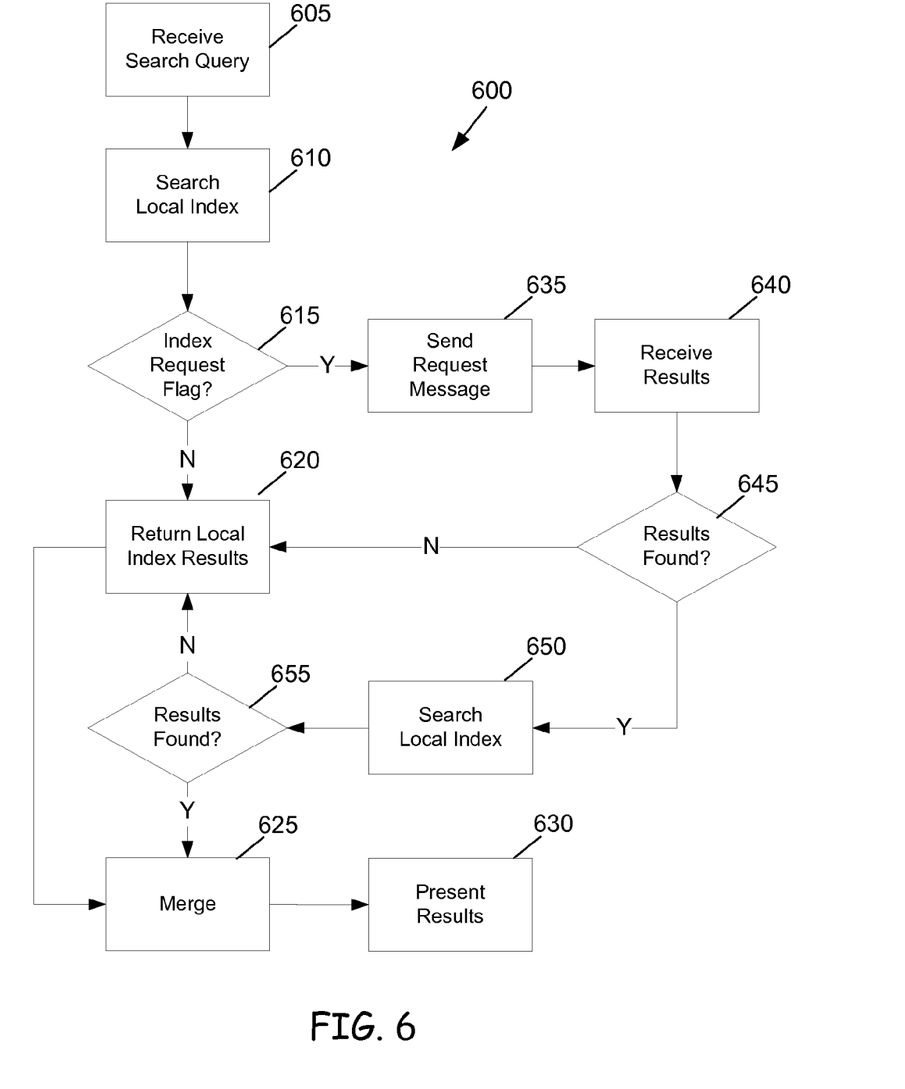
FIG. 6 shows a flowchart of an example method for searching linked content contained in electronic communications in an electronic communication system.

Referring now to FIG. 6, an example method 600 for searching linked content contained within an electronic communication is shown. In example embodiments, the method 600 is implemented by an application at a communication system, such as the indexing application executing at the server device described above in connection with FIG. 4.

The method 600 begins at an input module 605. The input module 605 is configured receive a search string from a messaging client comprising one or more key terms for searching content within an e-mail message mailbox of a particular user. An example of such a process using the OUTLOOK® messaging and collaboration client includes entry of search string "Windows Phone 7" into text field "Look for:" for searching within "Inbox" and selection of "Find Now" by a user. Other embodiments are possible.

Operational flow proceeds to a first search module 610. The first search module 610 is configured to perform a first local query of a local index managed by the indexing application against the search string as received by the input module 605. Example results of the first local query include e-mails messages including one or more of the key terms of the search string. In general, the results may be organized according to relevance, confidence, or any other metric either directly observed or inferred from metadata contained within and associated with e-mail message results of the first local query.

Operational flow then proceeds to a first decision module 615. The first decision module 615 is configured to determine whether linked content associated with the user has ever been transferred to any external indexing service. In example embodiments, such information may be contained within a list associated with the user and managed by the indexing application) including a specific designation (e.g., a flag and/or indexing service name) that linked content has previously been transferred to one or more external indexing services. Other embodiments are possible.

Operational flow branches to a return module 620 when the first decision module 615 determines that linked content associated with the user has not previously been transferred to an external indexing service. The return module 620 is configured to return results of the first local query as obtained by the first search module 610.

Operational flow then proceeds to a merge module 625. The merge module 625 is configured to merge results of the first local query with results associated with an external index query, as described in further detail below. In the example scenario, results associated with an external index query correspond to null. Operational flow then proceeds to a presentation module 630 configured to present merged results (i.e., first local query results) to the user via the messaging client.

Operational flow branches to a request module 635 when the first decision module 615 determines that linked content associated with the user has previously been transferred to an external indexing service. The request module 635 is configured to generate a message including a request addressed to one or more external indexing services identified at the first decision module 615 to search index content associated with one ore more key terms of the search string. An example searching related message "S" includes an identifier designating a name and electronic address of the indexing application, key terms of the search string, and additional metadata (e.g., S=[ID, Windows Phone 7, metadata]). Other embodiments are possible.

Example metadata of the message "S" is similar to the metadata of the example message "I" described above in connection with FIG. 5. Additionally, the message "S" is formed by an interface (e.g., first interface 420) according to properties of a communication channel for transport between the indexing application and a respective external indexing service, such as remote procedure call or other form of asynchronous or synchronous communication channel. The message "S" is received by an interface (e.g., second interface 430) of the one or more external indexing services which in turn query associated indices against the key terms of the search string.

Following generation of the message "S" by the request module 635, operational flow proceeds to a message receive module 640. The message receive module 640 is configured to receive a response message from the one or more external indexing services including results of respective external index queries. Example external index query results includes either a null response or include one or more links identified as having content associated with one or more of the key terms of the search string. In general, such results may be organized according to relevance, confidence, or any other metric either directly observed or inferred from metadata contained within and associated with the one or more links of external index query results.

Operational flow then proceeds to a first analysis module 645. The first analysis module 645 is configured to determine whether respective external index query results include a null response or one or more links identified as having content associated with one or more of the key terms of the search string.

Operational flow branches to the return module 620 when the first analysis module 645 determines that all respective external queries include a null response. As discussed above, the return module 620 is configured to return results of the first local query as obtained by the first search module 610. Operational flow then proceeds to the merge module 625 configured to merge results of the first local query with results associated with an external index query. In the example scenario, results associated with an external index query correspond to null. Operational flow then proceeds to a presentation module 630 configured to present merged results (i.e., first local query results) to the user via the messaging client.

Operational flow branches to a second search module 650 when the first analysis module 645 determines that respective external index query results include one or more links identified as having content associated with one or more of the key terms of the search string. The second search module 650 is configured to perform a second local query of the local index including against the one or more links returned by respective external indexing services. Example results of the second local query include e-mails messages including the one or more links. In general, links contained within e-mail messages of the second query may either be partially or wholly syntactically correct. Additionally, the results may be organized according to relevance, confidence, or any other metric either directly observed or inferred from metadata contained within and associated with e-mail message results of the second local query.

Operational flow then proceeds to a second analysis module 655. The second analysis module 655 is configured to analyze results of the second local query to determine whether the local index includes one or more links returned by respective external indexing services.

Operational flow branches to the return module 620 when the second analysis module 655 determines that the local index does not include e-mail messages containing one or more links returned by respective external indexing services. Operational flow then proceeds to the merge module 625 configured to merge results of the first local query with results of the second local query. In the example scenario, results of the second local index query correspond to null. Operational flow then proceeds to the presentation module 630 configured to present merged query results (i.e., first local query results) to the user via the messaging client.

Operational flow branches to the merge module 625 when the second analysis module 655 determines that the local index does include e-mail messages containing one or more links returned by respective external indexing services. In the example scenario, the merge module 625 configured to merge results of the first query with results of the second local query. Operational flow then proceeds to the presentation module 630 configured to present merged query results (i.e., first local query results+second local query results) to the user via the messaging client.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for indexing linked content contained within electronic communications, the method comprising:
   indexing, on a computing device, at least one electronic communication;

analyzing content of the at least one electronic communication at the computing device to identify linked content contained in the at least one electronic communication;

determining that summary data associated with the identified linked content is not contained in a local index;

forming a message at the computing device including a request to index the identified linked content;

sending the message from the computing device to an external indexing service for indexing the identified linked content on an external index;

receiving a response, from the external service, including new summary data associated with the identified linked content; and indexing the at least one electronic communication on the local index based upon the new summary data.

2. The method of claim 1, further comprising indexing the electronic communication upon one of: designation of receipt of the at least one electronic communication at the computing device; and designation of instantiation of a periodic index process configured to maintain an index at the computing device.

3. The method of claim 1, further comprising identifying linked content including at least a portion of an uniform resource indicator.

4. The method of claim 1, further comprising forming the message including an index process identifier, identified linked content, and metadata containing a plurality of additional information associated with identified linked content.

5. The method of claim 1, further comprising populating a list maintained by an index process designating transfer of identified linked content to the external service.

6. The method of claim 1, further comprising receiving a response from the external service including a designation of completion of indexing of identified linked content.

7. The method of claim 1, wherein the electronic communication is selected from a group including: an e-mail message; a text message; an instant message; a calendar item; a task item; a note item; a social collaboration message; and a voicemail message.

8. The method of claim 1, wherein new summary data associated with the identified linked content includes one or more key terms, contextual information, and other content associated with the linked content.

9. A method for searching linked content contained within electronic communications in a communication system, the method comprising:

receiving a search string at the communication system from a messaging application comprising at least one key term for searching electronic communications;

querying a local index at the communication system according to the search string to obtain first local query results;

identifying, at the communication system, at least one external service having received linked content from the communication system;

sending a message from the communication system to the external service, the message including a request to perform an external search of an external index;

receiving a response from the external indexing service including external query results;

querying the local index at the communication system using the external query results to obtain second local query results; and returning merged search results to the messaging application including at least a portion of the first local query results and the second local query results.

10. The method of claim 9, further comprising querying a list at the communication system to identify the at least one external service.

11. The method of claim 9, further comprising forming the message including a communication system identifier and the key term.

12. The method of claim 9, further comprising receiving external query results including null results.

13. The method of claim 9, further comprising receiving external query results including at least one link, wherein the at least one link is associated with the key term of the search string.

14. The method of claim 13, further comprising the second local query results including at least one electronic communication selected from a group including: an e-mail message; a text message; an instant message; a calendar item; a task item; a note item; a social collaboration message; and a voicemail message.

15. The method of claim 14, further comprising the at least one communication including at least a portion of an uniform resource indicator.

16. The method of claim 9, further comprising presenting the merged search results.

17. The method of claim 16, further comprising presenting the merged search results prioritized according to one of: a relevance metric; and a confidence metric.

18. The method claim 9, wherein the electronic communications selected from a group including: e-mail messages; text messages; instant messages; calendar items; task items; note items; social collaboration messages; and voicemail messages.

19. A computing device, comprising:

a processing unit; and a system memory connected to the processing unit, the system memory including instructions that, when executed by the processing unit, cause the processing unit to implement an indexing module and a searching module for evaluating linked content contained within electronic communications, wherein:

the indexing module is configured to:

receive instruction to index at least one electronic communication;

analyze content of the at least one electronic communication to identify linked content contained in the at least one electronic communication;

determine whether summary data associated with the identified linked content is contained in a local index;

if the local index contains summary data associated with the identified linked content then:

index the at least one electronic communication on the local index based upon the summary data and;

if the local index does not contain summary data associated with the identified linked content then:

form a first message including a request to index identified linked content, wherein the first message includes an index process identifier and identified linked content; and send the first message to a first external service for indexing the identified linked content on an external index; and the search module is configured to:

receive a search string comprising at least one key term for searching a plurality of electronic communications;

query a local index according to the search string to obtain first local query results;

identify at least one external service having received linked content from the search module;

send a second message to the at least one external service, the second message including a request to perform an external search of an external index;

receive a response from the at least one external indexing service including external query results;

query the local index according to the external query results to obtain second local query results; and return merged search results comprising an intersection of the first local query results and the second local query results.

20. The computing device claim 19, wherein the electronic communications selected from a group including: e-mail messages; text messages; instant messages; calendar items; task items; note items; social collaboration messages; and voicemail messages.

* * * * *